United States Patent Office

3,532,648
Patented Oct. 6, 1970

3,532,648
AMYLOSE STARCH-BASED CORRUGATING ADHESIVE
Donald L. Wilhelm, Decatur, Ill., assignor to A. E. Staley Manufacturing Company, Decatur, Ill., a corporation of Delaware
No Drawing. Filed Dec. 20, 1967, Ser. No. 691,960
Int. Cl. C08g 51/14
U.S. Cl. 260—17.2      16 Claims

ABSTRACT OF THE DISCLOSURE

Alkaline, heat-settable, starch-based corrugating adhesive containing resin-forming components, e.g. resorcinol and formaldehyde, and having unpasted starch solids suspended in an aqueous dispersion of cooked amylose. The adhesives have excellent waterproofness when cured.

---

This invention relates to potentially waterproof adhesives and, more particularly, to alkaline, heat-setting starch-based adhesives having properties rendering them excellently suited for utilization in the manufacture of corrugated paperboard products having high wet-strength.

Corrugated paperboard is relatively inexpensive and, if properly manufactured, is characterized by sufficient dry strength adapting it for many packaging applications. Consequently, corrugated paperboard has come into widespread usage. The technique commonly employed for its manufacture involves initially corrugating a paper sheet by passing the paper sheet between heated, fluted rolls to form the so-called "medium" of the ultimate product. Liquid heat-setting adhesive then is applied via a roller, brush, or the like to the tips of the flutes on one side of the corrugated medium. At the so-called "single facer" station of the operation, a flat sheet of paper known as a "liner" then is guided into contact with the adhesive bearing flutes of the medium and the adhesive is set by pressing the resultant laminate against a heated roll or plate. Using slightly longer heating sections, the aforedescribed steps basically are repeated at the so-called "double backer" station to bond a second liner sheet to the other side of the medium. Consistent with providing satisfactorily set bonds in the heating steps, commercial scale corrugators are run at the highest possible speeds.

Due to their relatively low cost and adaptability to high machine speeds, suspensions of ungelatinized starch in aqueous dispersions of cooked (gelatinized) starch commonly are employed as adhesives in the preparation of corrugated paperboard. The basic nature and preparation of adhesives of this type are described, for example, in Bauer U.S. Pats. Nos. 2,051,025; 2,102,937; and 2,212,557. As described in these patents, a "Bauer" adhesive is prepared by heating an aqueous starch slurry to gelatinize the starch and form a starch paste which serves as a carrier and suspension medium (also referred to as the "primary" portion of the adhesive) for a larger proportion of ungelatinized starch solids (sometimes referred to as the "secondary" portion of the adhesive) subsequently added after the paste is slightly cooled. In use, such starch-based adhesives are converted to rigid gels and set by a pasting of the ungelatinized secondary starch solids and a partial drying of the resultant gels during the above-described heating steps of the corrugating operation. Although such adhesives are useful if formulated to be on the acid side, alkaline formulations perform more satisfactorily in that an alkali, such as sodium hydroxide, lowers the gelatinization temperature of the starch and, hence, allows faster machine speeds to be employed for a given heat capacity.

Starch-based adhesives of the above-described type perform satisfactorily in the preparation of ordinary corrugated paperboard products. As commonly prepared, however, such adhesives are not moisture-resistant. They consequently are unsuited for use in preparing corrugated paperboard packaging materials which, to be acceptable, must be capable of maintaining their physical integrity when in contact with water. Such adhesives, for example, do not provide corrugated paperboard satisfactorily adapted for utilization as a suitable packaging material for articles such as frozen poultry, conventionally shipped while packed in ice, or articles such as bananas, during shipment through moist tropical climates.

Various techniques have been suggested in the prior art to impart water-resistance to starch-based adhesives. One approach which has enjoyed a limited degree of success involves an addition to the adhesive formulation of preformed resinous materials which themselves are water-insoluble, such as phenol-formaldehyde resins, urea-formaldehyde resins, ketone-formaldehyde resins, and acrolein condensates. Although this approach does provide adhesives which cure into water-resistant bonds, this type of formulation generally either does not develop desired maximum degrees of waterproofness or displays viscosity instability and sets up rapidly after mixing and, due to poor pot life, requires special handling procedures.

A modification which has provided a more advantageous improvement in the water-resistant properties of Bauer-type starch adhesives involves an incorporation into the formulation of mixtures of compounds which react with the starch during the preparation of the primary portion of the adhesive or during the heating steps of the laminating operation, or both, to form, in situ, starch-containing water-resistant resins. Resin-forming mixtures commonly employed in such modifications contain formaldehyde in combination with urea, phenol, resorcinol, acetone, or cyanamide. Examples of formulations containing such resin-forming mixtures are described in U.S. Pats. Nos. 2,884,389; 2,886,541; 3,019,120; 3,284,381; and 3,294,716. Adhesives of this type are capable of developing varying degrees of water-resistance when cured and, in most cases, have satisfactory pot lives. When formulated to be useful at commercially feasible corrugating machine speeds, however, they generally do not provide the ultimate in desirable waterproofing results, i.e. form boards which, after immersion in water for 24 hours, delaminate under tension applied to the adhesive bonds by a failure, not of the cured adhesive, but of the fiber in the bonded paper. Hence, the art has continued to search for adhesive formulations capable of developing such waterproof bonds yet having satisfactory properties for high-speed machine operation.

Accordingly, it is a primary object of the invention to provide a potentially waterproof corrugating adhesive.

It is a particular object of the present invention to provide a stable, heat-settable, potentially waterproof, starch-based corrugating adhesive which has significantly improved overall properties as compared to similar adhesives heretofore available.

Another particular object of the present invention is to provide a heat-settable, alkaline, starch-based corrugating adhesive having satisfactory pot life and which is adapted for use at feasible machine speeds in corrugators to provide corrugated paperboard in which tests for the wet-strength of the adhesive bonds evidences paper fiber failure.

Broadly described, the present invention constitutes a heat-settable, starch-based corrugating adhesive comprising an aqueous liquid mixture having a total starch dry solids content in the range of from about 15 to about 30% by weight and containing as essential ingredients (1) a suspension of unpasted starch solids in an aqueous starch paste carrier, said carrier containing a cooked amylose component and having a pure amylose content of at least about 35%, preferably more than 40%, by weight of the total carrier starch solids, dry solids basis, said unpasted starch solids being present in a major proportion of the adhesive total starch dry solids content, (2) a phenolic component in an amount in the range of from about 1% to about 10% by weight of the adhesive total starch dry solids content, (3) an aldehyde component in an amount corresponding to a mol ratio of said aldehyde component to said phenolic component of greater than 1:1, and (4) a sufficient amount of an alkaline material to give said adhesive a pH of at least about 9.

In certain preferred embodiments of the adhesives of the invention, at least a portion of the pasted starch solids of the carrier portion of the adhesives is provided by a thick boiling starch of ordinary pure amylose content. In other particularly preferred embodiment of the corrugating adhesive formulations of the invention, at least a portion of the unpasted starch suspended in the starch paste carrier is constituted by an amylose component, a cross-linked starch, or mixtures thereof.

It will be understood that the term "amylose component" as employed herein is intended to refer to amylosic materials containing at least about 50% by weight, dry solids basis, of pure amylose (correspondingly less than about 50% by weight pure amylopectin). Such amylosic materials correspond to amylose fractions recovered from starches which are mixtures of amylose and amylopectin, as well as whole native unmodified starches, obtained from genetically modified corn, for example, containing the requisite high amylose content. Commercially available materials falling in the latter category include those marketed under the trade names of "Amylomaize," "Amylon 55," and "Amylon 70." It further will be understood that the phrase "starch of ordinary pure amylose content" is intended to refer to amylosic materials containing not more than about 30% by weight pure amylose, dry solids basis.

The term "pure amylose" is used to refer to the glucose carbohydrate polymer that is present in ordinary starch and has a straight-chain configuration. The term "pure amylopectin" is the corresponding polymer having a branched chain structure. Both occur in most varieties of starch. For example, corn starch contains about 27% pure amylose, potato starch about 24%, tapioca about 17%, and so on, with the remainder of the starch being pure amylopectin.

By the practice of the present invention, heat-curable corrugating adhesives having valuable properties are obtained. At 100–110° F., i.e. the temperature range at which most corrugating adhesives are held prior to being applied at the glue line, they advantageously are characterized by viscosities measured through a Bauer (Stein-Hall) viscosity cup in the range of from about 16 to about 60 seconds, and in preferred embodiments in the range of from about 20 to about 45 seconds. Such viscosities coincide with those preferred for use in corrugating equipment. The adhesives of the present invention, furthermore, display suitable viscosity stability, increases of not more than 5 seconds in their Bauer viscosities within four hours after preparation being typical. The adhesives of the invention, when cured, provide bonds having waterproofness comparable to, and in the preferred embodiments substantially superior to, those provided by similar "in situ" type starch-based adhesives heretofore available. The force required to delaminate corrugated paperboard prepared using the preferred adhesives of the present invention, determined after immersing the paperboard in water for 24 hours, for example, typically ranges up to and over 40% more than that required to delaminate boards prepared using adhesives based on starch of ordinary pure amylose content but being otherwise identical. The magnitude of the superiority of the strength of the preferred adhesives of the invention actually is even greater since boards prepared therefrom, after soaking, characteristically rupture due to a failure of the fibers of the paper rather than failure of the bond, as do conventionally prepared boards. Advantageously, this improvement in waterproofness and wet-strength is achieved without significant sacrifice to and, in preferred cases, even some improvement in the speed at which the adhesive can be employed in corrugating machines. In this respect, the preferred corrugating adhesives of the present invention typically are adapted to be used in corrugating machines operating at speeds on the order of 250–350 linear feet per minute to provide excellent bonds with ordinary, as well as waxed, corrugated board medium. Other important advantages possessed by the adhesives of the invention include compatibility with machine speed accelerators, such as borax, and utility at relatively high pHs.

The discovery of the advantageous properties of the amylose-phenolic component-based corrugating adhesives of the invention could not be anticipated from the performance of amylose in "in situ" type starch corrugating adhesives heretofore reported. In U.S. Pat. No. 3,284,381, for example, Hickey et al. state that amylose normally is not suitable for use in preparing the carrier portion of a Bauer-type corrugating adhesive since cooked amylose dispersions are unstable and display amylose precipitation upon the normal subsequent addition of the raw starch secondary portion of the adhesive. The patent says the precipitation problem can be solved by stabilizing the cooked amylose carrier with 10–100 parts by weight each of formaldehyde and urea per 100 parts dispersed amylose. Specific data showing the instability of cooked amylose dispersions as carriers in conventional Bauer-type formulations are presented in Hickey U.S. Pat. No. 3,222,199.

The phenolic component employed in the adhesives of the present invention suitably may be any monohydric or polyhydric phenolic compound or mixture thereof which, in the presence of a strong alkali (e.g. sodium hydroxide), is capable of reacting with formaldehyde to form a thermosetting water-insoluble resin. Such phenolic compounds contain at least three unsubstituted positions on a benzene moiety reactive with formaldehyde and constitute a class of materials well known to the art and readily available in commerce. Suitable phenolic compounds, which may contain one or more benzene nuclei, include phenol, resorcinol, hydroquinone, pyrogallol, pyrocatechol, bisphenol and 4,4'-dihydroxy-diphenylmethane. Due to its availability and relatively low cost, resorcinol is the phenolic component preferred for use.

The aldehyde component of the adhesive formulations of the invention suitably may be any of the aldehyde-producing compounds or a mixture thereof which, in the presence of a strong alkali, (e.g. sodium hydroxide), is capable of reacting with phenol to form a thermosetting, water-insoluble resin. Aldehyde-producing compounds of this type also belong to a class of materials well known to the art. Examples of such aldehyde-producing compounds include free aldehydes such as formaldehyde, acetaldehyde, propionaldehyde, butyraldehyde, furfural, and glyoxal, as well as compounds which generate aldehydes when heated, such as paraformaldehyde, hexamethylene tetramine, and the like. Formaldehyde-producing compounds (e.g. formaldehyde and paraformaldehyde), due to their relatively low cost, constitute the aldehyde components preferred for use.

The alkaline ingredient employed in the adhesives of the present invention preferably is a strong alkali base such as sodium hydroxide, potassium hydroxide, or mixtures thereof. Weaker bases which also are operable but less preferred unless employed in combination with a strong base include calcium hydroxide, sodium carbonate, potassium carbonate, and the like.

In the formulation of the adhesives of the invention the carrier portion is prepared by forming an aqueous slurry containing the amylose component, phenolic component, and alkali ingredient. The order of addition of the ingredients in preparing the starting slurry is not critical. After formulation of the slurry, the aqueous mixture then is heated by any convenient heating means, e.g. using steam directly or indirectly, to a temperature sufficient to gelatinize the amylose component and convert the slurry to a paste. Since overheating tends to provide formulations having less stable viscosities, the use of extreme temperatures in the carrier heating step should be avoided. The temperatures generally employed in the carrier cooking step range from about 145° to about 175° F. The cooked carrier dispersion thereafter should be held at such elevated temperatures under agitation for a short time period (e.g. at least about 5 minutes), to allow the cooked amylose dispersion to become smooth in consistency. The aqueous dispersion of cooked amylose then is cooled, usually by an addition of cool water, to a temperature below the gelatinization temperature of the starch to be used as the unpasted (secondary) starch portion of the adhesive. Temperatures in the range of from about 100° F. to about 135° F. are typical. Following cooling of the cooked amylose-containing carrier, unpasted starch solids, the aldehyde component, and, if desired, adjuvants are admixed with the carrier which serves as a suspending medium for the unpasted starch solids. The addition of these ingredients suitably may be carried out simultaneously or separately and in any sequence. Usually the unpasted secondary starch solids and aldehyde are premixed in aqueous slurry form and the separately prepared carrier portion then is stirred into the resultant secondary unpasted starch slurry. The resultant combination then is stirred for sufficient time to provide a stable homogeneous, aqueous dispersion. Mixing periods employed after combination of the unpasted starch and carrier portions of the adhesive generally are at least about 30 minutes, e.g. in the range of from about 45 minutes to two hours. Following the mixing of the formulation, the adhesive is ready for use. If desired, or to meet particular requirements, additional water may be added to adjust the consistency or solids content of the composition. From the above, it will be seen that, excepting the use of a cooked amylose carrier, the broad formulation technique employed in the present invention corresponds closely to the basic method described in U.S. Pats. Nos. 2,884,389; 2,890,182; and 3,294,716.

One preparation technique preferred for use is the following:

(A) Preparation of a carrier (primary) portion containing cooked amylose (1) In a mixer tank fitted with a stirrer, form a slurry of the amylose component and water;

(2) add the phenolic component and stir the slurry for about 5 minutes to insure the uniformity of the dispersion;

(3) add caustic, for example sodium hydroxide, potassium hydroxide, and the like as flake, solid or dissolved in water in sufficient amount to paste amylose component in the following heating step, (4) heat the resultant mixture with steam to a temperature of from about 150°–160° F. and hold with stirring for about 10 minutes;

(5) dilute resultant dispersion with cold water to provide desired consistency and lower temperature to about 125 to 135° F.

(B) Preparation of unpasted starch (secondary) portion (1) In a second tank fitted with a stirrer, add unpasted (gelatinizable) starch to water maintained at a temperature in the range of about 70 to 90° F.;

(2) add, with agitation, the aldehyde component and adjuvants, preferably as aqueous solutions or dispersions.

(C) Preparation of adhesive composition (1) With stirring, slowly add carrier portion to the secondary portion of the mixture, and (2) continue agitation for one to two hours;

(3) if desired, adjust viscosity by addition of water.

The particular amounts of the respective components employed in particular embodiments of the adhesives of the present invention correspond substantially to those of ingredients of similar functional category employed in conventional resorcinol-based adhesives of the "in situ" type using starch of ordinary pure amylose content as the carrier starch.

As in conventional "in situ" type starch adhesives, in the formulation of the present invention the overall water to starch solids weight ratios are maintained at levels providing aqueous liquid formulations containing from about 15 to about 30%, and preferbaly from about 22.5% to about 30%, by weight starch dry solids, and the major proportion of the total starch solids content of the formulations is constituted by the unpasted starch solids added via the adhesive secondary portion. More generally, the dry solids weight ratio of unpasted starch to cooked starch in the formulations of the invention is in the range of from about 2:1 to about 7:1. The more preferred formulations, by virtue of their increased potential waterproofness, viscosity and gelatin characteristics, have a dry solids weight ratio of unpasted starch to cooked starch in the range of from about 3:1 to about 6:1.

The amount of phenolic component added in the preparation of the adhesives of the invention is in the range of from about 1% to about 10% by weight of the total starch dry solids content (both gelatinized and ungelatinized). At phenolic component levels below 1% by weight, the formulations do not display significant improvement in potential waterproofness. The addition of over about 10% by weight phenolic component results in formulations which tend to increase in viscosity too rapidly and, hence, display unsuitable pot life. The preferred formulations are characterized by phenolic component additions in the range of from about 2 to about 7.5% by weight of the adhesive total starch dry solids content. A particular feature of the preferred embodiments of the present formulations is that low levels of phenolic component, e.g. from about 2 to about 4% by weight, advantageously can be utilized to provide relatively inexpensive stable adhesives having superior potential waterproofness as compared to prior art corrugating adhesives and adapted for use in corrugating machines operating at commercially feasible speeds, e.g. on the order of 250–350 linear feet per minute.

In the formulations of the invention the aldehyde component is added in amounts corresponding to a mole ratio of aldehyde component to phenolic component of greater than 1:1. Lower concentrations of aldehyde component do not yield satisfactory curing and waterproofing properties. On the other hand, too large a proportion of aldehyde component provides formulations which have poor pot life. Generally, the mol ratio of aldehyde component to phenolic component is maintained in the range of from about 1.25:1 to about 2.25:1 and, preferably, in the range of from about 1.4:1 to about 2:1.

The amount of alkaline catalyst employed suitably may vary concomitant with providing at about 100–110° F. a final formulation containing ungelatinized starch solids and having a pH of at least about 9. As will be apparent to those skilled in the art, high concentrations of alkali can cause gelatinization of the unpasted starch solids even at relatively low temperatures. In the practice of the present invention, such concentrations are avoided. In general, due to their lower gelation points and, hence, their ability to be used at faster machine speeds, the preferred formulations contain sufficient alkali to yield a pH in the range of from about 9 to about 12.0 and, more preferably, in the range of from about 10.0 to about 11.5. In preferred embodiments the desired pH conditions are provided, for example, by an addition of alkali equivalent to from about 1.5% to about 2.5% sodium hydroxide based on the adhesive total starch content, dry solids basis.

Any gelatinizable starch or starch fraction can be used in adhesives of the present invention as the unpasted secondary starch solids. Gelatinizable starches include unmodified, modified, derivatized, and/or cross-linked granular starches. Useful unmodified granular starches include the raw starches of ordinary pure amylose content derived from corn, rice, wheat, potato, tapioca and arrow-root as well as raw genetically produced starches containing at least 50% by weight pure amylose, dry solids basis. Modified granular starches include thin-boiling starches made by heating a water slurry of an unmodified starch below its gelatinization point with a mineral acid (e.g. hydrochloric acid) or an oxidizing agent (e.g. calcium hypochlorite). Derivatized granular starches include starch esters (e.g. starch acetate and starch propionate) and starch ethers (e.g. hydroxyethyl, carboxymethyl, and cyanoethyl starch), prepared from unmodified or modified granular starches under non-gelatinizing conditions. Granular cross-linked starches include ungelatinized starch products made by reacting an unmodified, modified, or derivatized granular starch with a polyfunctional reactant (e.g. phosphorous oxychloride, epichlorohydrin, N,N'-bis-acrylamide, dimethylol urea, other water-soluble urea-formaldehyde condensates, and dimethylol ethylene urea). Starches which have been partially pre-gelatinized, such as by compaction, but which have retained a substantial portion of their granular character, i.e. the major portion of the granules display birefringence, also may be employed in providing a portion of the unpasted starch solids portion of the adhesives. When they are employed, however, the content of water-soluble material in such partially gelatinized starches preferably should not exceed about 15% by weight, dry solids basis.

The unpasted secondary starch solids requirement of the adhesives of the invention, may comprise amylose-rich fractions separated from a starch containing amylose and amylopectin. Since such fractions tend to gel at relatively low solids concentrations in water, they generally are used in formulations having low total starch contents or in combination with a granular starch or starches in order to maintain the viscosities of the resultant adhesives at the above-described levels desired for corrugated board production. In such embodiments of the adhesives, the secondary starch portion generally is constituted by at least about 25%, and more preferably at least about 50% by weight, dry solids basis, of a granular starch.

By varying the secondary (unpasted) starch employed, the properties of the adhesive advantageously can be tailored to particular corrugated-board production requirements. It has been found, for example, that when an amylose component is added to a given formulation to provide at least a portion of the secondary starch portion of the mixture, the waterproofness of the adhesive is even further improved. The improvement in waterproofness increases as the proportion of amylose component added to the secondary portion is increased. The increases in waterproofness are accompanied by slight decreases in the machine speed of the adhesive. Waterproofness, or machine speed, therefore, can be sacrificed in particular applications, if desired, to maximize the other adhesive characteristic, or the two properties may be balanced, as desired by appropriate adjustment of the content of amylose component in the secondary starch portion. Since the variations effected in machine speed by such formulation adjustments actually are relatively small, particularly preferred formulations in regard to overall properties are obtained by using an amylose component, more preferably an amylose component in the form of a native high-amylose starch, in the secondary portion in amounts of at least about 50% by weight of the secondary total starch dry solids content.

In another preferred set of adhesives of the present invention, the unpasted secondary starch solids portion is provided at least in part by a granular cross-linked starch, exemplified by the cross-linked starches described above. Such embodiments display excellent machine speed and have more than adequate waterproofing characteristics. Cross-linked starches particularly preferred for use in the secondary portion of the adhesives of the invention are those which have maximum or peak "C.I.V." viscosities (run in Corn Industries Foundation Viscometer) of at least about 180, and more preferably at least about 250, gram-centimeters at 5% concentrations in water. Especially advantageous for use are the thick-pasting granular cross-linked starches having maximum C.I.V. viscosities in the range of from about 350 to about 600 gram-centimeters prepared by reacting a granular unmodified starch, e.g. unmodified corn starch, with a water-soluble urea-formaldehyde composition such as dimethylol urea, monomethylol urea, and water-soluble urea - formaldehyde resins. Specific examples of such cross-linked starches and a method for preparing them using from about 0.05 to about 0.15% by weight of the starch of the water-soluble urea - formaldehyde compositions are described in U.S. Pat. No. 2,838,465.

In another preferred adhesive of the invention, an amylose component and a granular cross-linked starch are employed in combination in the gelatinizable secondary starch portion. Such formulations provide a means of achieving close to maximum waterproofness at relatively high machine speeds. Combinations especially valuable in such respects are gelatinizable starch solids mixtures constituting at least about 50% by weight, dry solids basis, of an amylose component in the form of a whole native high-amylose starch with the remainder being a granular cross-linked starch of the above-described type in which the cross-linkages are introduced by a water-soluble urea-formaldehyde composition.

In addition to the amylose component, the carrier portion of the adhesives of the invention suitably may, and preferably does, contain cooked (pasted) starch of ordinary pure amylose content. Broadly, the nature of ordinary starches which can be employed is not critical and supplemental additions to the carrier may be made of any of the ordinary granular starches described above, the corresponding pregelatinized forms thereof, as well as dextrinized starches derived therefrom. When a thin-boiling ordinary starch is employed (as also is true without the addition of ordinary starch) in the preparation of the adhesives of the invention, Bauer viscosities of under 18 seconds at 100°–110° F. typically are obtained. While such viscosities are suitable for some corrugating operations, most machines for preparing corrugated paperboard generally are operated better with adhesives having Bauer viscosities of over 20 seconds and in the range of from about 20 to about 45 seconds. Accordingly, in certain preferred embodiments of the invention a starch of ordinary pure amylose content having appropriate pasting characteristics, i.e. is thicker-boiling than amylose, is incorporated supplementally during the preparation of the carrier portion of the adhesives in an amount effective to increase the viscosity of the cooked amylose-containing carrier. Any ordinary starch which is effective when gelatinized to thicken the carrier is suitable for this use. Specific examples of such starches include whole native starches of ordinary pure amylose content, such as unmodified corn starch, and cross-linked starches, exemplified by those described above. Particularly preferred embodiments of the adhesives of the invention are provided by a supplemental addition to the amylose-containing carrier of a thick-boiling cross-linked starch of the above-described type containing linkages introduced by reaction of granular starch with a water-soluble urea-formaldehyde composition.

The use of starch of ordinary pure amylose content in the carrier of the adhesives of the invention, particularly in embodiments wherein an amylose component is omitted from the secondary portion, detracts from the potential waterproofness of the resultant adhesives. For this reason supplemental addition of ordinary starch to the amylose-based carriers of the adhesives are preferred to be maintained at levels providing carriers containing at least about 35%, and preferably at least about 40%, pure amylose by weight of the carrier total starch dry solids content. Using amylose in the form of a native whole starch having a pure amylose content of about 55% by weight (dry basis) as the amylose component in the carrier, for example, ordinary starches of about 25% by weight pure amylose, dry basis, may be used in the carrier at dry solids weight ratios of ordinary starch to amylose component of less than 2:1 and preferably less than 1:1. In the more preferred embodiments of the invention, exemplified by those wherein the carrier contains a supplemental thick-boiling cross-linked starch of the type described containing linkages introduced by a water-soluble urea-formaldehyde composition, especially valuable formulations are obtained at dry solids weight ratios of ordinary starch to amylose component in the carrier in the range of from about 0.25:1 to about 0.75:1.

Adjuvants conventionally employed in minor amounts in corrugating adhesives to augment or improve certain properties suitably may be incorporated into the formulations of the invention. Such supplemental agents include fillers such as clay, amylose plasticizers such as glycerol, dextrose or corn syrup solids to improve dry bonding properties, and borax to improve machine speed. A particular feature of the preferred adhesives of the invention is that with proper agitation minor amounts of borax, e.g. from about 0.1% to about 1.5% by weight of the adhesive total starch dry solids content, may be employed to improve machine speed with little or no sacrifice of adhesive waterproofness.

In use, the adhesives of the invention are utilized to prepare corrugated paperboard in the conventional manner. With proper agitation at the conventional 100°–110° F. holding temperature, they display suitable pot life ranging up to and over 48 hours. After application at the glue line, they are set and cured by the application of heat as described above. Advantageously, the adhesives of the invention are adapted for use not only with commonly employed paperboard medium but also with paperboard medium impregnated with wax. Both the dry and wet strengths of the resultant corrugated products are excellent as tested by dry flexing and wet ply adhesive tests conducted after immersing sections of the board in water for 24 hours.

Another adhesive of the Bauer type of improved wet strength and containing an amylose component in the secondary portion of the adhesive has been discovered. In this class of adhesive, the carrier portion is pasted starch of ordinary pure amylose content (i.e. contains less than about 30% by weight pure amylose, dry solids basis) and the unpasted secondary solids of the adhesive are constituted at least in part by an amylose component. In all other respects, e.g. total starch solids content, weight ratio of unpasted to pasted starch, nature and concentration of phenolic and aldehyde components, pH, use of supplemental (e.g. cross-linked) starches in the secondary portion, and modes of preparation and utilization, this adhesive is made and used in the ways already described for adhesives in which the carrier contains the amylose components. In the adhesives of this kind (carrier of ordinary starch and secondary containing an amylose component), the secondary portion amylose component preferably constitutes at least about 50% by weight of the secondary total starch solids content, and preferably is a native whole starch having a pure amylose content of at least 50% by weight, dry solids basis.

The invention having been described in detail, the following examples are presented to show specific embodiments thereof. It will be understood that the examples given are presented for illustration purposes only and not by way of limitation. Unless otherwise specified, all percentages indicated are based on weight. All starting starches employed in tests described in the examples had a normal moisture content, i.e. contained about 12% moisture, total weight basis.

EXAMPLE I

This example illustrates an embodiment of the amylose carrier-based adhesives of the invention which also contains an amylose component in the ungelatinized (secondary) starch portion.

To prepare the carrier (primary) portion of the adhesive about 105 gm. of a native starch containing about 55% pure amylose, dry solids basis, were stirred into about 525 ml. water in a mixer. About 45 gm. resorcinol were incorporated into the aqueous slurry, and the resultant mass was agitated for about five minutes to a smooth consistency. About 15 gm. sodium hydroxide in 50 ml. water were then stirred into the slurry and the resultant mixture was heated directly with steam to about 150–160° F. While continuing agitation, the heated mass was held at 150–160° F. for about 10 minutes to complete cooking of the starch. About 450 ml. of cold water was then added to lower the temperature of the dispersion to about 130° F.

In a separate mixer, the secondary portion of the adhesive was formulated by initially stirring 600 gm. of the 55% amylose native starch into about 1,000 ml. of water having a temperature of about 75° F. About 64 ml. of an aqueous 37% formaldehyde solution were then stirred into the resultant slurry.

In a small replica of a Pratt secondary mixer tank, adapted for circulation through a short loop of pipe by means of a pump, the cooked amylose carrier initially prepared was then slowly stirred into the formaldehyde-containing secondary starch slurry over a period of about 15–20 minutes. The resultant mixture was agitated with circulation for an additional 30–45 minutes. The resultant suspension of unpasted amylose in the pasted amylose carrier had a temperature of 105°–110° F. and a Bauer viscosity, measured using a Stein-Hall viscosity cup, of about 18 seconds.

The formulation (7.25% resorcinol by weight total starch dry solids) was then utilized to apply a double-backer glue line to the exposed flutes of a previously single-faced 26-lb. high wet-strength corrugating board medium (marketed by International Paper Corp. as "Hydrochem" medium paper). A 69-lb. high wet-strength corrugating board liner (marketed by International Paper Corp. as "Hydrokraft" liner paper) was guided into contact with the glue line to form a double-faced corrugated laminate. The resultant sandwich was then pressed together for 5–7 seconds against a hot plate at 350° F. to simulate double-backer application at machine speeds of 300–420 ft./min. using a 35-foot heating section.

The double-backer bond of the resultant board had satisfactory dry strength as evidenced by the board withstanding hand flexing. After being immersed in water at about 77° F. or 24 hours, pin-adhesive tests on 8.5 in.² samples of the board revealed that 45 pounds of force were required to rupture the double-backer bond with fiber failure being observed. Stripping additional water-soaked samples of the board by hand revealed fiber pull upon delamination over about 75% of the double-backer bond area.

The viscosity of the adhesive formulation was measured three hours after the earlier measurement and found to be about 19 seconds, i.e. it was stable.

EXAMPLE II

This example illustrates a modification of the amylose carrier-based adhesives of the invention wherein unmodified starch is added to the carrier to increase adhesive viscosity.

The general procedure of Example I was repeated to initially prepare adhesive and then produce a corrugated laminate, except that 40 gm. of unmodified corn starch were added and pasted along with the 105 gm. of high amylose starch in the preparation of the carrier portion of the formulation.

At the end of the 30–45 minute mixing period, the resultant formulation (6.9% resorcinol by weight total starch dry solids) was a stable aqueous dispersion having a temperature of about 110° F. and a viscosity, as measured by a Bauer (Stein-Hall) cup, of about 22 seconds After an additional three hours, the viscosity was 27 seconds, indicating satisfactory stability.

The double-backer bond of the corrugated board produced from the 22 second adhesive did not show any delamination upon dry flexing. Pin adhesion tests on the double-backer bond of 24-hour water soaked samples gave a reading of about 47 pounds at delamination, and fiber failure at rupture was evident. Stripping by hand of another sample of soaked board indicated fiber pull upon delamination over about 95% of the double-backer bond area.

EXAMPLE III

This example illustrates a modification of the amylose carrier-based adhesives of the invention wherein a cross-linked starch is added to the carrier to increase viscosity.

The general adhesive and board preparation procedures of Example I were repeated excepting about 40 gm. of a granular cross-linked corn starch containing linkages introduced by a water-soluble urea-formaldehyde composition and having a peak C.I.V. viscosity in the range of 350–600 gm.-cm. were added and pasted with the native high amylose starch in the preparation of the carrier portion of the formulation.

After the 30–45 minute mixing period, a stable aqueous dispersion was obtained having a Bauer (Stein-Hall) viscosity of about 21 seconds. After an additional mixing period of three hours, the viscosity of the adhesive was 23 seconds, exhibiting satisfactory stability.

The double-backer bond of the board prepared using the 21-second adhesive formulation (6.9% resorcinol by weight total starch dry solids) had excellent flexing strength when dry and gave a pin adhesion test reading (after immersion in water for 24 hours) of about 48 pounds at delamination. The ruptured board revealed failure was with fiber pull. Hand delamination of another sample of board soaked for 24 hours indicated fiber pull over 100% of the double-backer bond area.

EXAMPLE IV

To compare the properties of the amylose carrier-based adhesive formulations of the invention with those of conventional corrugating adhesives, the general procedures of Examples I and II were repeated excepting unmodified corn starch was substituted for the native high amylose starch throughout the formulations. The viscosity properties of the resultant adhesive formulations and the results of wet-strength tests carried out on the partial boards produced using them are shown in Table 1.

fied starch of ordinary amylose content is utilized to supply the unpasted (secondary) starch solids portion of the formulation.

The general procedure of Example II was repeated to prepare adhesive and corrugated board excepting 600 gm. of unmodified corn starch were substituted for the native high amylose starch in preparing the formaldehyde-containing secondary starch slurry.

The resultant formulation (6.9% resorcinol by weight total starch dry solids), after the 30–45 minute mixing period, was a stable dispersion having a viscosity, as measured by a Bauer (Stein-Hall) cup, of about 22 seconds. After three additional hours of mixing, the viscosity of the formulation was 27 seconds.

The double-backer bond of the corrugated laminate prepared using the adhesive, when dry, did not delaminate when flexed and gave a reading in the pin adhesion test, after soaking in water for 24 hours, of about 38 pounds. Hand stripping of the soaked sample of the board did not reveal any fiber failure.

Although the fiber pull on delamination of boards produced with this embodiment of the adhesives of the invention was insignificant, the results of this example, when taken with those of Example IV, further demonstrate the unexpectedly high waterproofness and surprising homogeneity of the amylose carrier-based adhesives of the invention.

EXAMPLE VI

This example illustrates a modification of the amylose carrier-based adhesives of the invention wherein cross-linked starch is utilized to supply the unpasted (secondary) starch solids of the formulation.

The general procedure of Example III was repeated to prepare an adhesive and corrugated board excepting that 600 gm. of the cross-linked granular starch described in Example III was substituted for amylose in the preparation of the formaldehyde-containing secondary starch slurry.

The resultant mixed formulation (6.9% resorcinol by weight total starch dry solids) was a stable dispersion having a Bauer (Stein-Hall) viscosity of about 21 seconds.

After soaking in water for 24 hours, the double-backer bond of a sample of the resultant board prepared using the adhesive gave a pin adhesion test of about 43 pounds. About 5% of the double-backer bond area showed fiber failure when another soaked sample was delaminated by hand stripping.

EXAMPLE VII

This example illustrates embodiments of the amylose carrier-based adhesives of the present invention where the unpasted (secondary) starch portions of the formulations are constituted by mixtures of amylose and starch or ordinary amylose content.

TABLE 1

| Adhesive | | Bauer viscosity, seconds | | Strength of double-backer bond of 24-hour soaked samples | |
|---|---|---|---|---|---|
| Starch | | After 1 hr. mixing | After 4 hrs. mixing | Pin adhesion, lbs. | Hand strip fiber pull, percent |
| Primary mix, gm. | Secondary mix, gm. | | | | |
| 105 (unmodified corn starch) | 600 (unmodified corn starch) | 49 | 36 | a 34 | None. |
| 145 (unmodified corn starch) | 600 (unmodified corn starch) | 30 | 34 | a 34 | None. | a No fiber pull observed at bond failure.

A comparison of the test results shown in Table 1 with those described in Examples I–III clearly indicates the superiority of the amylose carrier-based adhesives of the invention as compared to conventional starch-based adhesives.

EXAMPLE V

This example illustrates a modification of the amylose carrier-based adhesives of the invention where unmodi- The general procedures of Example III was repeated to prepare four adhesives, except that (1) in one case 100 grams of the cross-linked starch of Example III were employed as a replacement in the secondary starch mix for a corresponding amount of the amylose component, and (2) in separate formulations each 100, 200, and 300 gm. of unmodified corn starch were substituted for corresponding amounts of amylose components in the adhesive secondary portion. The viscosities of the resultant formulations and the wet-strengths of double-backer bonds produced as in Example I using the respective formulations are given in Table 2.

EXAMPLE IX

This example illustrates additional embodiments of the amylose carrier-based adhesives of the invention containing mixtures of amylose and starch of ordinary amylose content in the secondary (ungelatinized) portion thereof and further shows the effect on adhesive gelatin properties and water-proofness of varying the concentration of the phenolic component in such formulations.

A series of adhesives having Bauer viscosities in the range of 20–35 seconds was prepared by following, in turn, modifications of the general formulation procedure of Example I wherein, in the manner shown in Table 4, (1) ordinary starch was added supplementally to the carrier portion, (2) ordinary starch was partially substituted for amylose in the secondary portion, and (3) the concentration of resorcinol was varied. The gelation properties of the respective formulations obtained are reported in Table 4.

Following the procedure of Example VIII, corrugated laminates having a waxed medium were prepared using each of the formulations. The wet strengths of the double-backer bonds of the resultant laminates are given in Table 4.

TABLE 2

| Adhesive | | | Bauer viscosity, seconds | | Strength of double-backer bond of 24-hour soaked samples | |
|---|---|---|---|---|---|---|
| Secondary starch mix | | | | | | |
| Amylose, gm. | Unmodified corn starch, gm. | Cross-linked starch of Ex. III, gm. | After 1 hr. mixing | After 4 hrs. mixing | Pin adhesion, lbs. | Hand strip fiber pull percent |
| 500 | 100 | | 21 | 23 | [1] 47 | 50 |
| 400 | 200 | | 21 | 23 | 45 | 10 |
| 300 | 300 | | 21 | 23 | 43 | 5 |
| 500 | | 100 | 21 | 23 | [1] 48 | 100 |

[1] Bond rupture with fiber pull.

EXAMPLE VIII

This example illustrates the effects on gelation properties and waterproofness of varying the concentration of phenolic component in the amylose based-adhesive formulations of the invention.

Excepting for varying the concentration of resorcinol added via the carrier, as shown in Table 3, the general formulation procedure of Example II was repeated to prepare, in turn, four adhesives having Bauer viscosities in the range of 20–35 seconds. The gelation properties of the resultant formulations are listed in the table.

Following the general procedure of Example 1 double-backer liners were applied (0.010 in. glue line clearance) to previously single-faced laminates using the respective adhesive formulations, except that a single-faced laminate having a waxed Hydrokraft paper medium was employed. The wet strengths of the laminates are shown in the table. For comparison purposes the gelation properties of a conventional adhesive (Example IV adhesive containing 105 gm. starch in the carrier mix) and wet pin adhesion data of laminates prepared therefrom using the same waxed liner are included in the table.

TABLE 3

| Resorcinol concentration, percent total starch, d.s.b. | Adhesive | | |
|---|---|---|---|
| | Gelation properties | | |
| | Gel. temp. range, °F. | Gel. rate, min. | Pin adhesion, lbs.[1] |
| 6.9 | 151–165 | 3.75 | [2] 38.5 |
| 5.3 | 151–164 | 2.5 | [2] 38.5 |
| 3.5 | 150–161 | 2.5 | [2] 45 |
| 2.3 | 144–154 | 3.0 | [2] 40 |
| 6.9 (conventional starch adhesive of Example IV) | 142–150 | 2.5 | 24 |

[1] Strength of double-backer bond of 24-hour soaked laminates.
[2] Bond rupture was with paper fiber failure.

TABLE 4

| Adhesive | | | | | | | |
|---|---|---|---|---|---|---|---|
| Primary mix | | Secondary mix | | Resorcionol concentration, percent total starch, d.s.b. | Gelation temp. range, °F. | Gelation time, min. | Pin adhesion, lbs.[1] |
| Amylose, gm. | Ordinary starch, gm. | Amylose, gm. | Ordinary starch, gm. | | | | |
| 105 | [2] 60 | 500 | [3] 100 | 6.9 | 147–159 | 3.0 | [4] 38 |
| 105 | [2] 60 | 500 | [3] 100 | 3.5 | 148–152 | 1.5 | [4] 82 |
| 105 | [3] 60 | 500 | [3] 100 | 6.9 | 144–160 | 3.75 | [4] 41 |
| 105 | [3] 60 | 500 | [3] 100 | 3.5 | 148–152 | 2.0 | [4] 37 |
| 105 | [3] 60 | 500 | [3] 100 | 2.3 | 138–147 | 1.75 | 32 |

[1] Strength of double-backer bond of 24-hour soaked laminates.
[2] Unmodified corn starch.
[3] Cross-linked starch of Example III.
[4] Indicates bond rupture was with paper fiber failure.

EXAMPLE X

This example illustrates the effect on gelation properties and waterproofness of adding borax to the amylose carrier-based adhesives of the invention.

The general mixing procedures of Example I was repeated to prepare two adhesives excepting that 40 gm. of the cross-linked starch of Example III were added supplementally to the carrier portion and 100 gm. of the same cross-linked starch were substituted for a corresponding amount of amylose in the 600 gm. secondary starch portion of each adhesive. To one of the formulations 1.4% borax by weight of total starch dry solids was added via the secondary starch mix. Borax was omitted from the other formulation. The properties of the resultant adhesives and the wet-strengths of laminates prepared as in Example I are shown in Table 5.

TABLE 5

| Adhesive | | | | Strength of double-backer bond of 24-hour soaked laminates | |
|---|---|---|---|---|---|
| Concentration borax, percent total starch, d.s.b. | Bauer viscosity after 4 hrs. mixing, seconds | Gelation temp. range, °F. | Gelation time, min. | Pin adhesion, lbs. | Hand strip fiber pull, percent |
| ---- | 34 | 149–163 | 2.0 | ¹48 | 100 |
| 1.4 | 34 | 154–163 | 1.75 | ¹48 | 100 |

¹ Indicates bond rupture with fiber pull.

EXAMPLE XI

This example illustrates an embodiment of the adhesives of the invention of the class wherein the carrier is a starch of ordinary pure amylose content and an amylose component is added in the secondary unpasted starch portion of the adhesive.

The general formulation procedure of Example II was repeated excepting that, in the preparation of the carrier portion of the adhesive, the amylose component was omitted, and a carrier starch paste was prepared containing a total of 145 gm. of unmodified corn starch. As in Example II, 600 gm. of a whole native starch having a pure amylose content of about 55% by weight, dry solids basis, were employed as the secondary unpasted starch portion of the formulation.

The resultant formulation had a Bauer viscosity of about 24 seconds after being mixed one hour, and 28 seconds after four hours mixing.

Following the procedure of Example I a double-backer liner was applied to a previously prepared single-faced medium. The double-backer bond of a sample of the resultant corrugated board, after immersion in water for 24 hours, gave a pin adhesion test reading of about 46 pounds, with fiber pull being observed at failure. Hand stripping of another sample of water-soaked board showed fiber pull over about 50% of the double-backer bond area.

This example, taken with the data shown in Example IV, clearly shows the superior waterproofness of the ordinary starch carrier-based, amylose secondary starch-containing adhesives of the invention as compared to conventional adhesives based totally on starch of ordinary pure amylose content.

EXAMPLE XII

The procedure of Example XI was repeated excepting that a whole native starch having a pure amylose content of about 70% by weight, dry solids basis, was substituted for the 55% pure amylose content starch in the adhesive secondary portion.

The resultant formulation had Bauer viscosities of 23 and 25 seconds after mixing periods of one and four hours, respectively. The results of pin adhesion test readings and hand stripping tests carried out on 24 hour soaked samples of the double-backer bond of corrugated board prepared for the adhesive were identical to the results obtained with the adhesive of Example XI.

Further embodiments of this invention which do not depart from the spirit and scope thereof, of course, will be apparent to those skilled in the art; accordingly, the foregoing is to be interpreted as illustrative only and the invention will be understood to be limited only by the scope of the appended claims.

What is claimed is:

1. A heat-settable starch-based corrugating adhesive consisting essentially of an aqueous liquid mixture having a total starch dry solids content in the range of from about 15 to about 30% by weight and containing as essential ingredients
   (1) a substantially urea-free suspension of unpasted starch solids in an aqueous starch paste carrier, said carrier containing a cooked amylose component and having an overall pure amylose content of at least about 35% based on the total weight of carrier starch dry solids, said unpasted starch solids being present in major proportion to the adhesive total starch solids content, said amylose having not been stabilized by mixing with paraformaldehyde and urea or the operating equivalents thereof;
   (2) from about 1.0% to about 10.0% of a phenolic component by weight of the adhesive total starch dry solids content;
   (3) an aldehyde component in an amount corresponding to a mol ratio of said aldehyde component to said phenolic component of greater than 1:1; and
   (4) a sufficient amount of an alkaline material to give said adhesive a pH of at least about 9.

2. The adhesive according to claim 1 wherein said carrier amylose component is a whole native starch containing at least 50% by weight pure amylose, dry solids basis, and said carrier has a pure amylose content of at least about 40%.

3. The adhesive according to claim 1 wherein the dry solids weight ratio of unpasted solids to pasted solids is in the range of from about 2:1 to about 7:1 and the pH of said adhesive is in the range of from about 9 to about 12.

4. The adhesive according to claim 1 wherein said phenolic component is resorcinol in an amount from about 2 to about 7.5% by weight, and said aldehyde component is a substance which provides formaldehyde in a mol ratio of formaldehyde to resorcinol in the range of from about 1.25:1 to about 2.25:1.

5. The adhesive according to claim 1 wherein said carrier also contains a thickening amount of a supplemental starch of ordinary pure amylose content.

6. The adhesive according to claim 1 wherein at least a portion of said unpasted starch suspended in said carrier is selected from the group consisting of an amylose component, cross-linked starch and mixtures thereof.

7. The adhesive according to claim 4 wherein said aqueous mixture has a total starch dry solids content in the range of from about 22.5 to about 30%, said amylose component in said carrier is a whole native starch containing at least about 50% by weight pure amylose, dry solids basis, said carrier has an overall content of pure amylose of at least about 40%, the dry solids weight ratio of unpasted starch to pasted starch in said carrier is in the range of from about 3:1 to about 6:1, and the pH of said adhesive is in the range of from about 10.0 to about 11.5.

8. The adhesive according to claim 7 wherein said carrier also contains a thickening amount of a supplemental starch of ordinary pure amylose content.

9. The adhesive according to claim 8 wherein said supplemental starch is cross-linked starch containing linkages introduced by reaction of starch with a water-soluble urea-formaldehyde composition and the dry solids weight ratio of said cross-linked starch to said amylose component in said carrier is in the range of from about 0.25:1 to about 0.75:1.

10. The adhesive according to claim 7 wherein said carrier also contains a thickening amount of a supplemental starch of ordinary pure amylose content and at least a portion of said unpasted starch suspended in said carrier is selected from the group consisting of an amylose component, cross-linked starch and mixtures thereof.

11. The adhesive according to claim 7 wherein said carrier also contains a thickening amount of a supplemental starch of ordinary pure amylose content and a whole native starch having a content of pure amylose of at least about 50% by weight, dry solids basis, constitutes at least about 50% of the total weight of unpasted starch dry solids in said adhesive.

12. The adhesive according to claim 11 wherein said unpasted starch solids portion also contains granular cross-linked starch containing linkages introduced by reaction of starch with a water-soluble urea-formaldehyde composition.

13. The adhesive according to claim 12 wherein said supplemental starch in said carrier is cross-linked starch containing linkages introduced by reaction of starch with a water-soluble urea-formaldehyde composition and the dry solids weight ratio of said cross-linked starch to said amylose component in said carrier is in the range of from about 0.25:1 to about 0.75:1.

14. A heat-settable starch-based corrugating adhesive consisting essentially of an aqueous liquid mixture having a starch dry solids content in the range of from about 15 to about 30% by weight and containing as essential ingredients
(1) a substantially urea-free suspension of unpasted starch solids in an aqueous starch paste carrier, said carrie consisting of cooked starch having a content of pure amylose of less than about 30% by weight, dry solids basis, said unpasted starch solids containing an unpasted amylose component and being present in major proportion to the adhesive total starch dry solids content;
(2) from about 1% to about 10% of a phenolic component by weight of the adhesive total starch dry solids content;
(3) an aldehyde component in an amount corresponding to a mol ratio of said aldehyde component to said phenolic component of greater than 1:1; and
(4) a sufficient amount of an alkaline material to give said adhesive a pH of at least about 9.

15. The adhesive according to claim 14 wherein said unpasted amylose component is a whole native starch containing at least 50% by weight pure amylose, dry solids basis, and said unpasted amylose component constitutes at least about 50% of the total weight of unpasted starch dry solids in said adhesive.

16. The adhesive according to claim 15 wherein the dry solids weight ratio of unpasted solids to pasted solids is in the range of from about 2:1 to about 7:1, said phenolic component is resorcinol in an amount of from about 2 to about 7.5% by weight, said aldehyde component is a substance which provides formaldehyde in a mol ratio of formaldehyde to resorcinol in the range of from about 1.25:1 to about 2.25:1, and the pH of said adhesive is in the range of from about 9 to about 12.0

References Cited

UNITED STATES PATENTS

| | | | |
|---|---|---|---|
| 3,182,031 | 5/1965 | Bauer et al. | 260—17.3 |
| 3,284,381 | 11/1966 | Hickey et al. | 260—17.3 |
| 3,294,716 | 12/1966 | Pinney | 260—17.2 |

OTHER REFERENCES

Chem. Abst. 65:12400d, "Amylose Adhesives for Laminating Cellulosics," National Starch and Chem. Corp., 1966.

Chem. Abst. 67:34043q, "Corrugated Carboard," Nat. Starch and Chem. Corp., 1966.

WILLIAM H. SHORT, Primary Examiner

E. WOODBERRY, Assistant Examiner

U.S. Cl. X.R.

161—264